United States Patent
Bongiorno et al.

(10) Patent No.: US 9,434,350 B2
(45) Date of Patent: Sep. 6, 2016

(54) SYSTEMS AND METHODS FOR INTERFERENCE REDUCTION DURING KEYLESS IGNITION AUTHENTICATION

(71) Applicant: GM GLOBAL TECHNOLOGY OPERATIONS LLC, Detroit, MI (US)

(72) Inventors: Charles J. Bongiorno, Sterling Heights, MI (US); Aaron P. Creguer, Fenton, MI (US); David T. Proefke, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 39 days.

(21) Appl. No.: 14/513,739

(22) Filed: Oct. 14, 2014

(65) Prior Publication Data

US 2015/0057884 A1    Feb. 26, 2015

Related U.S. Application Data

(63) Continuation of application No. 13/552,778, filed on Jul. 19, 2012, now Pat. No. 8,930,087.

(60) Provisional application No. 61/521,688, filed on Aug. 9, 2011.

(51) Int. Cl.
| | |
|---|---|
| B60R 25/01 | (2013.01) |
| B60R 25/04 | (2013.01) |
| B60R 25/24 | (2013.01) |
| B60R 16/03 | (2006.01) |

(52) U.S. Cl.
CPC ............. *B60R 25/01* (2013.01); *B60R 25/04* (2013.01); *B60R 25/24* (2013.01); *B60R 16/0315* (2013.01); *B60R 2025/0405* (2013.01)

(58) Field of Classification Search
CPC ....... B60R 25/01; B60R 25/04; B60R 25/24; B60R 2025/0405; B60R 16/0315
See application file for complete search history.

(56) References Cited

U.S. PATENT DOCUMENTS

| | | | | |
|---|---|---|---|---|
| 6,718,240 | B1* | 4/2004 | Suda | B60N 2/0248 318/480 |
| 2003/0212481 | A1* | 11/2003 | Fuller | G07C 9/00309 701/36 |
| 2008/0024270 | A1* | 1/2008 | Katagiri | B60R 25/04 340/5.72 |
| 2008/0061932 | A1* | 3/2008 | Hermann | B60R 25/2036 340/5.72 |
| 2008/0106390 | A1* | 5/2008 | White | B60K 26/02 340/426.11 |
| 2008/0150682 | A1* | 6/2008 | Shii | B60R 25/24 340/5.22 |
| 2008/0223646 | A1* | 9/2008 | White | B60K 28/063 180/287 |
| 2010/0100287 | A1* | 4/2010 | Kasai | B60R 25/00 701/48 |
| 2010/0244560 | A1* | 9/2010 | Sato | B60R 16/03 307/10.1 |
| 2010/0286846 | A1* | 11/2010 | Liang | B60R 25/24 701/2 |

* cited by examiner

Primary Examiner — Rodney Butler
Assistant Examiner — Frederick Brushaber
(74) Attorney, Agent, or Firm — Lorenz & Kopf, LLP

(57) ABSTRACT

Methods and apparatus are provided for interference reduction during keyless authentication. The apparatus includes a control system having a controller configured to detect an authentication event and deactivate at least one device within the vehicle. The control system is also configured to transmit an authentication command and to reactive the at least one device within the vehicle in response to receiving a valid authentication signal. The method includes an authentication method for a user to operate a vehicle wherein an authentication event is detected and at least one device within the vehicle is deactivated. An authentication command is transmitted and the at least one device within the vehicle is reactivated in response to receiving a valid authentication signal.

20 Claims, 2 Drawing Sheets

SYSTEMS AND METHODS FOR INTERFERENCE REDUCTION DURING KEYLESS IGNITION AUTHENTICATION

CROSS REFERENCE TO RELATED APPLICATIONS

This application is a continuation of pending U.S. application Ser. No. 13/552,778 filed Jul. 19, 2012.

TECHNICAL FIELD

The technical field generally relates to keyless ignition systems for vehicles, and more particularly to interference reduction within the vehicle during keyless ignition authentication.

BACKGROUND

It is known in the art to provide remote activation devices, especially in connection with vehicles. These often take the form of a small electronic fob that can be conveniently carried by the vehicle operator. The fob usually contains a radio transceiver that communicates with a transceiver and control system of the vehicle. For example, when a user activates an "unlock" button on the fob, the fob sends a radio message to the vehicle control system, which then causes one or more of the door locks to open.

One recent modernization of ignition systems is the advent of "keyless" ignition systems with "push-button" (or other keyless) engine starting. Such systems use an electronic "key" (code within the fob) that does not have to be inserted into an ignition switch of a vehicle, but merely be present in a predetermined authorization zone, such as the passenger compartment of the vehicle. When the control system detects that an authorized electronic key is within the authorization zone, the driver may start the vehicle by simply activating (e.g., pressing) the ignition starter (e.g., button). If the control system does not detect an authorized key within the authorization zone, the control system disables the ignition system of the vehicle so that the vehicle cannot be started.

One drawback of keyless ignition systems is that they operate at relatively low power levels so as not to extend the authentication zone beyond the passenger compartment of the vehicle. Also, typical keyless ignition systems operate within a relatively low frequency band (e.g., 20-134 kHz). Both these conditions render conventional keyless ignition systems susceptible to magnetic or electrical interference, which may impede or prevent authentication. Failure or delay in properly authenticating a valid vehicle user may frustrate the vehicle user and detract from her/his enjoyment of the vehicle.

Accordingly, it is desirable to provide a keyless ignition system for a vehicle. Also, it is desirable to reduce interference within the vehicle during keyless ignition authentication. Additionally, other desirable features and characteristics of the present invention will become apparent from the subsequent description taken in conjunction with the accompanying drawings and the foregoing technical field and background.

SUMMARY

An apparatus is provided for interference reduction during keyless authentication. In one embodiment, the apparatus includes a control system having a controller configured to detect an authentication event and deactivate at least one device within the vehicle. The control system is also configured to transmit an authentication command and to reactivate the at least one device within the vehicle in response to receiving a valid authentication signal.

A method is provided for interference reduction during keyless authentication. In one embodiment, the method includes an authentication method for a user to operate a vehicle wherein an authentication event is detected and at least one device within the vehicle is deactivated. An authentication command is transmitted and the at least one device within the vehicle is reactivated in response to receiving a valid authentication signal.

DESCRIPTION OF THE DRAWINGS

The subject matter will hereinafter be described in conjunction with the following drawing figures, wherein like numerals denote like elements, and.

DESCRIPTION

The following detailed description is merely exemplary in nature and is not intended to limit the subject matter of the disclosure or its uses. Furthermore, there is no intention to be bound by any expressed or implied theory presented in the preceding technical field, background, brief summary or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Finally, for the sake of brevity, conventional techniques and components related to vehicle electrical parts and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention. It should also be understood that FIGS. 1-2 are merely illustrative and may not be drawn to scale.

Figure 1:
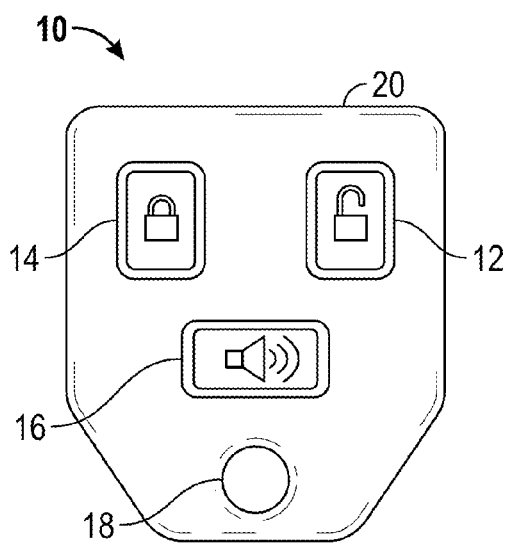
FIG. 1 is an illustration of a keyless ignition fob suitable for use in exemplary embodiments of the present disclosure.

FIG. 1 illustrates a fob 10 that includes, but is not limited to, an "unlock" function button 12 to unlock one or more doors of the vehicle; a "lock" function button 14, which typically locks all doors of the vehicle; and an "alarm" function button 16 for emergency situations. The fob 10 may also include a key attachment aperture 18 in the fob case 20 facilitating the user to attach a key ring to carry the user's home, office or other keys along with the fob 10.

Figure 2:
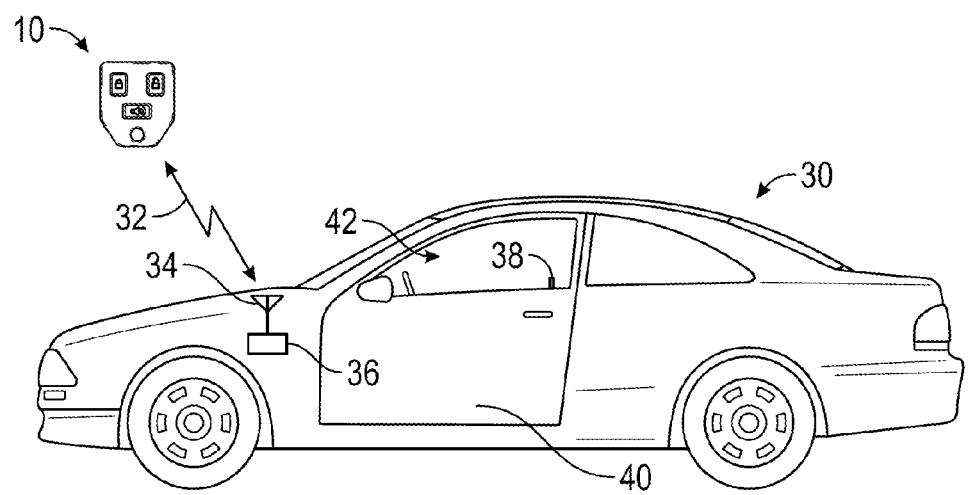
FIG. 2 is an illustration of a vehicle suitable for using the keyless ignition fob of FIG. 1 in accordance with exemplary embodiments of the present disclosure.

FIG. 2 illustrates fob 10 interacting with a vehicle 30. When one of the function buttons (12, 14 or 16 of FIG. 1) on fob 10 is activated by the user, fob 10 sends wireless signal 32 to the vehicle 30 where it is received by antenna 34 coupled to a control system 36 (e.g., a vehicle controller). Control system 36 interprets the signal 32 received from fob 10 and, depending upon which function has been activated by the user, causes the corresponding vehicle sub-system to respond. For example, if the "unlock" button (12 of FIG. 1) has been activated, then control system 36 causes a lock 38 on door 40 to move from a locked to an unlocked position.

Unlocking door 40 is one of a number of triggers that cause the control system 36 to begin an authentication process by which the control system verifies that the fob is within an authentication zone, such as the passenger compartment 42. Typically, the control system 36 transmits a signal or command to the fob 10, which, if within range (typically limited to the passenger compartment 42), responds with a signal containing a valid authentication code that the control system can compare to stored authorized codes for starting and operating the vehicle 30. Other triggers causing the control system 36 to initiate the authentication process include, but are not limited to receiving signals indicating (detecting), the door 40 opening or closing, activation of an engine start actuator (e.g., button) or an individual sitting in the driver seat (not shown) of the vehicle 30.

However, in an effort not to extend the authentication zone beyond the passenger compartment 42 of the vehicle 30, most keyless ignition systems operate at relatively low power levels and in a relatively low frequency band (e.g., 20-134 kHz) rendering conventional keyless ignition systems susceptible to magnetic or electrical interference (hereinafter "interference") that may impede or prevent authentication. It is expected that either by design or usage, one or more devices capable of generating interference within the frequency band used for authentication will be operated within the passenger compartment 42 of the vehicle 30. Such devices include, but are not limited to, wireless cellular telephone charging systems, accessory 12 volt power outlets (and user devices coupled thereto); cigarette lighters (and user devices coupled thereto); and AC inverter circuits (and user devices coupled thereto). Any one of these devices, or combinations of them, may generate enough interference to impede or prevent authentication, which may frustrate the operator of the vehicle.

According to exemplary embodiments, the present disclosure reduces such interference by temporarily deactivating devices of known or potential interference. Deactivation may be effected via a number of actions including, but not limited to, interruption of power to such devices; transmitting a command signal to such devices causing them to cease transmitting or operating internal circuits producing the interference; or, for devices coupled to a vehicle wired or wireless network, broadcasting a network message to such devices causing them to cease transmitting or operating internal circuits producing the interference. Deactivation of the known or potential interfering devices is temporary (for some time period) or until the authentication process has completed as will be discuss below in conjunction with FIG. 3. In this way, interruption of the use and enjoyment of these devices is minimized and the authentication process is unimpeded.

Figure 3:
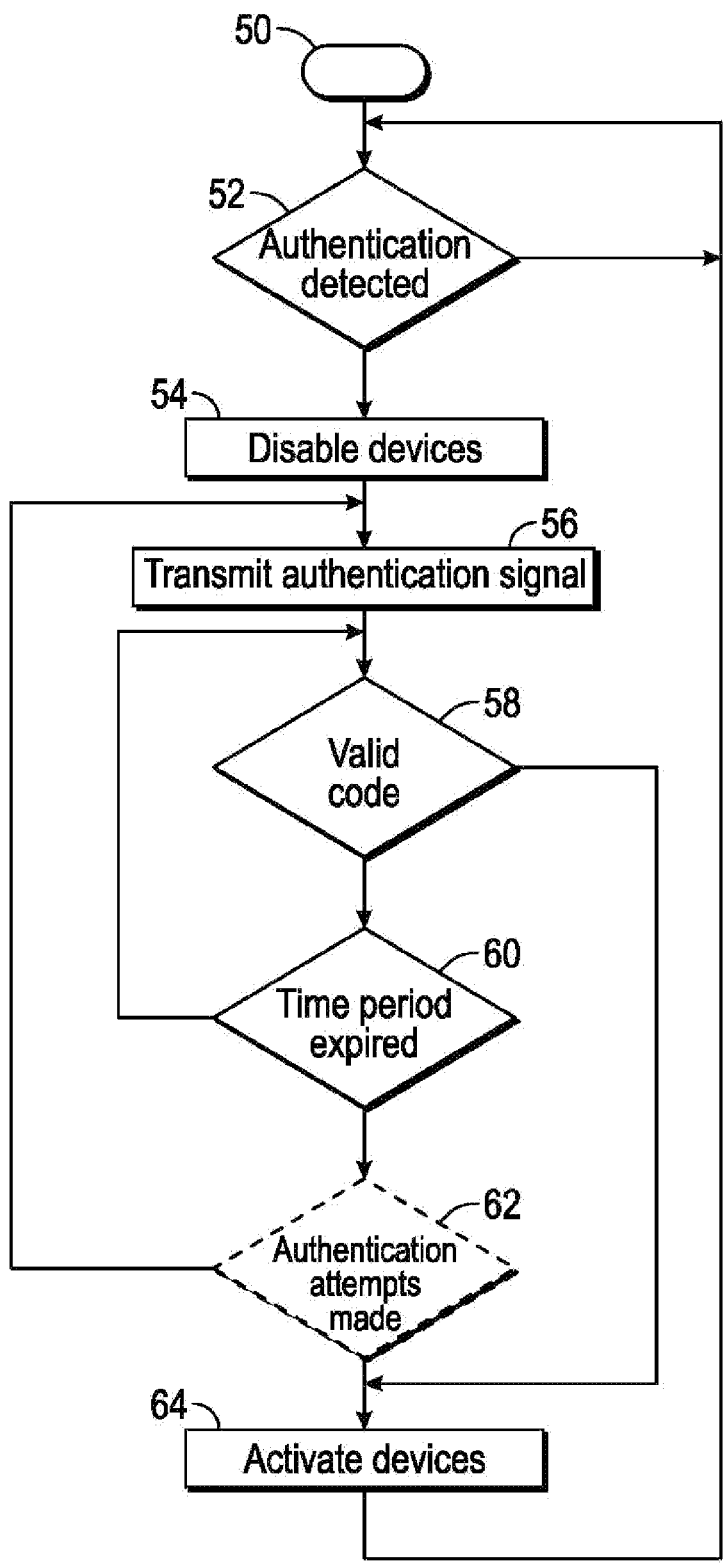
FIG. 3 is a flow diagram of an interference reducing keyless ignition authentication method in accordance with exemplary embodiments of the present disclosure.

Referring now to FIG. 3, a flow diagram illustrating a method 50 for keyless ignition in accordance with exemplary embodiments is shown. The various tasks performed in connection with the method 50 of FIG. 3 may be performed by software, hardware, firmware, or any combination thereof. For illustrative purposes, the following description of the method of FIG. 3 may refer to elements mentioned above in connection with FIGS. 1-2. In practice, portions of the method of FIG. 3 may be performed by different elements of the described system. It should also be appreciated that the method of FIG. 3 may include any number of additional or alternative tasks and that the method of FIG. 3 may be incorporated into a more comprehensive procedure or process having additional functionality not described in detail herein. Moreover, one or more of the tasks shown in FIG. 3 could be omitted from an embodiment of the method of FIG. 3 as long as the intended overall functionality remains intact.

The routine begins with decision 52 operating in a loop to determine whether an authentication trigger event has been detected. According to various embodiments, authentication events include, but are not limited to one or more of the following events: an "unlock" signal is received from fob 10; detecting door 40 opening or closing, detecting activation of an engine start actuator (e.g., button) or detecting an individual sitting in the driver seat (not shown) of the vehicle 30. Once an authentication event is detected, step 54 disables all known or potential devices operating within the vehicle that may generate interference within the frequency band used for authentication. Such devices include, but are not limited to, wireless cellular telephone charging systems, accessory 12 volt power outlets (and user devices coupled thereto); cigar lighters (and user devices coupled thereto); and AC inverter circuits (and user devices coupled thereto). Next, step 56 transmits an authentication command signal within the authorization zone and decision 58 determines whether a valid authorization code was received. If so, the devices are reactivated (step 64) to minimize the time when the devices cannot be used and enjoyed by the vehicle occupants. However, a negative determination of decision 58 result in decision 60 determining whether the time period for the fob responding has expired. If not, the routine loops back to decision 58. However, if the time period has expired, the routine continues. In one embodiment, the devices are immediately reactivated (step 64). However, in other embodiments, more than one authentication attempt (e.g., three or five) may be made by including decision 62, which queries whether the designated number of authentication attempts have been made. If not, the routine loops back to retransmit the authentication command signal (step 56), however, if all designated authentication attempts have been made, the devices are reactivated in step 64, and the routine returns again to the detection loop of decision 52, which awaits another authentication event.

Accordingly, a keyless ignition system is provided for a vehicle that reduces interference during the authentication process. While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing summary and detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An authentication method for a user to operate a vehicle, comprising:
   detecting, by a processor within the vehicle, an authentication event via activation of a vehicle actuator;
   deactivating at least one authentication interfering electronic device within a passenger compartment of the vehicle;
   transmitting a wireless authentication command from the vehicle; and
   reactivating the at least one authentication interfering electronic device within the vehicle in response to receiving a wireless valid authentication signal from the remote transceiver.

2. The method of claim 1, wherein the detecting comprises detecting an engine start actuator being activated.

3. The method of claim 1, wherein the detecting comprises receiving a signal from a fob.

4. The method of claim 3, wherein the detecting comprises receiving an unlock signal from the fob.

5. The method of claim 1, wherein the detecting comprises detecting a door opening or closing.

6. The method of claim 1, wherein the deactivating comprises interrupting power to the at least one authentication interfering electronic device.

7. The method of claim 6, wherein the reactivating comprises restoring power to the at least one authentication interfering electronic device.

8. The method of claim 1, wherein the deactivating comprises sending a command to the at least one authentication interfering electronic device to cease transmitting.

9. An authentication method for a user to operate a vehicle, comprising:
   receiving a authentication request via activation of an engine actuator of the vehicle;
   deactivating at least one authentication interfering electronic device within a passenger compartment the vehicle;
   transmitting a wireless authentication command from the vehicle;
   initiating a timer for a time period;
   determining whether a valid authentication signal was wirelessly received prior to expiration of the time period to provide a validation signal; and
   reactivating the at least one authentication interfering electronic device within the vehicle in response to the validation signal or the expiration of the time period.

10. The method of claim 9, further comprising re-transmitting the authentication command during the time period.

11. The method of claim 9, wherein the deactivating comprises interrupting power to the at least one authentication interfering electronic device.

12. The method of claim 11, wherein the reactivating comprises restoring power to the at least one authentication interfering electronic device.

13. The method of claim 9, wherein the deactivating comprises sending a command to the at least one authentication interfering electronic device to cease transmitting.

14. An authentication system for a vehicle, comprising:
   a controller configured to:
      receive a authentication request via activation of a vehicle actuator;
      deactivate at least one authentication interfering electronic device within a passenger compartment of the vehicle, selected from the group of authentication interfering electronic devices: cellular telephone charging system, accessory twelve volt power outlet, cigarette lighter and AC inverter circuit;
      transmit a wireless authentication command; and
      reactivate the at least one authentication interfering electronic device within the vehicle in response to wirelessly receiving a valid authentication signal.

15. The authentication system for a vehicle of claim 14, wherein the authentication request comprises detecting an engine start actuator being activated.

16. The authentication system for a vehicle of claim 14, wherein the authentication request comprises receiving a signal from a fob.

17. The authentication system for a vehicle of claim 16, wherein the signal from the fob comprises an unlock signal.

18. The authentication system for a vehicle of claim 14, wherein authentication request comprises detecting a door opening.

19. The authentication system for a vehicle of claim 14, wherein the deactivating comprises interrupting power to the at least one authentication interfering electronic device.

20. The authentication system for a vehicle of claim 14, wherein the deactivating comprises sending a command to the at least one authentication interfering electronic device to cease transmitting.

* * * * *